(12) United States Patent
Dickenson et al.

(10) Patent No.: US 8,881,125 B2
(45) Date of Patent: Nov. 4, 2014

(54) INDIRECT SOFTWARE PERFORMANCE ANALYSIS

(75) Inventors: Marc Alan Dickenson, Austin, TX (US); Andrew Geissler, Pflugerville, TX (US); Adriana Kobylak, Round Rock, TX (US); Aditya Kumar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 13/493,790

(22) Filed: Jun. 11, 2012

(65) Prior Publication Data

US 2013/0332913 A1    Dec. 12, 2013

(51) Int. Cl.
*G06F 9/45* (2006.01)
*G06F 11/36* (2006.01)

(52) U.S. Cl.
CPC ............ *G06F 8/443* (2013.01); *G06F 11/3644* (2013.01)
USPC ........................................................ 717/158

(58) Field of Classification Search
CPC .............. G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | |
|---|---|---|---|
| 5,355,487 A | 10/1994 | Keller et al. | |
| 6,216,237 B1 | 4/2001 | Klemm et al. | |
| 6,668,372 B1 | 12/2003 | Wu | |
| 7,010,546 B1 | 3/2006 | Kolawa et al. | |
| 7,703,079 B1 | 4/2010 | Burrows et al. | |
| 7,716,643 B2 | 5/2010 | Goldin | |
| 7,739,099 B2 | 6/2010 | Liu et al. | |
| 2001/0049782 A1 | 12/2001 | Hsu et al. | |
| 2002/0166112 A1* | 11/2002 | Martin et al. | 717/124 |
| 2005/0172267 A1* | 8/2005 | Bergin | 717/124 |
| 2007/0168970 A1* | 7/2007 | Li et al. | 717/124 |
| 2008/0184209 A1* | 7/2008 | LaFrance-Linden | 717/130 |
| 2009/0276762 A1* | 11/2009 | Ponitsch | 717/127 |
| 2010/0299655 A1* | 11/2010 | Heisch et al. | 717/130 |
| 2011/0138365 A1* | 6/2011 | Schmelter et al. | 717/130 |
| 2012/0204153 A1* | 8/2012 | Peterson et al. | 717/124 |

OTHER PUBLICATIONS

Bootlog XP, http://www.greatis.com/utilities/bootlogxp/.*

(Continued)

*Primary Examiner* — Wei Zhen
*Assistant Examiner* — Zhan Chen
(74) *Attorney, Agent, or Firm* — Robert H. Frantz; Parashos T. Kalaitzis; Jeffrey S. LaBaw

(57) ABSTRACT

Performance impact of a computing system component on a transient end-to-end system operation is estimated by profiling an overall characteristic for a transient end-to-end system operation, and simultaneously profiling a program code component for a second characteristic, thereby collecting a first pair of data points, repeating the operational period while introducing a known artificial delay into the program code component, and while profiling the overall performance characteristic for the system and for the program code component, thereby collecting pairs of data points for each repetition of the operational period for each of the artificial delays; curve fitting and analyzing intercepts of the collected data points to estimate the effect of the artificial delays in the program code component on the transient end-to-end system operation; and reporting the estimate correlated to potential optimal transient end-to-end system operation.

15 Claims, 8 Drawing Sheets

Data Acquisition Phase

(56) References Cited

OTHER PUBLICATIONS

Windows Boot Analyzer—BootLogXP, www.greatis.com/utilities/bootlogxp/, 2009.*
Courtois et al., "Using regression splines for software performance analysis," 2000.*
ASI-Test; "Basics of System Testing vs End-to-End Testing"; retrieved on May 17, 2012 from http://www.asi-test.com/ASI/system-vs-endtoend-testing/.
Goyal; "Probabilistic Modeling of Computer System Availability", retrieved from I.B.M. Thomas J. Watson Research Center.
Huh; "An Efficient Statistical Profile Technique for Monitoring of Grid Applications"; Retrieved on May 18, 2012 from http://mathnet.kaist.ac.kr/mathnet/kms_tex/982044.pdf.
IBM; "Setting an Operation as a critical path target"; retrieved on May 17, 2012 from http://publib.boulder.ibm.com/infocenter/tivihelp/v3r1/topic/com.ibm.tivol.
Linux; "Profiling entire system activity with sysprof"; retrieved on May 15, 2012 from http://archive09.linux.com/feature/136114.
LTTng; "LTTng Project" retrieved on May 15, 2012 from http://lttng.org/.
MSDN; "End-to-End Testing for SOA-Based Systems"; retrieved on May 17, 2012 from http://msdn.microsoft.com/en-us/library/cc194885.aspx.
Parasoft; "End to End Testing & Validation"; retrieved on May 17, 2012 from http://www.parasoft.com/jsp/products/article.jsp?articleID=3114.
Tools; "Quick start guide to gprof"; retrieved on May 15, 2012 from http://tools.ca.sandia.gov/mediawiki/index.php/Quick_start_guide_to_gprof.
Webopedia; "Heisenbug"; retrieved on May 15, 2012 from http://www.webopedia.com/TERM/H/heisenbug.html.
Webopedia; "Heisenbug" retrieved on May 17, 2012 from http://www.webopedia.com/TERM/H/heisenbug.html.
Webopedia; "Bohrbug" retrieved on May 17, 2012 from http:/www.webopedia.com/TERM/B/bohrbug.html.
Webopedia; "Flexible Service Processor"; retrieved on May 17, 2012 from http://www.webopedia.com/TERM/F/Flexible_Service_Processor.html.
CNET; "Editors Review of Bootlog XP", retrieved on Mar. 20, 2014 from http://download.cnet.com/Bootlog-XP/3000-2094_4-10864629.html.
EHOW; "How to Read an ETL File", retrieved on Mar. 20, 2014 from http://www.ehow.com/how_8661758_read-etl-file.html.
Greatis; "Bootlog XP vs Microsoft Bootvis", retrieved on Mar. 20, 2014 from http://greatis.com/utilities/bootlogxp/bootvis_replacement.htm.

* cited by examiner

Data Acquisition Phase

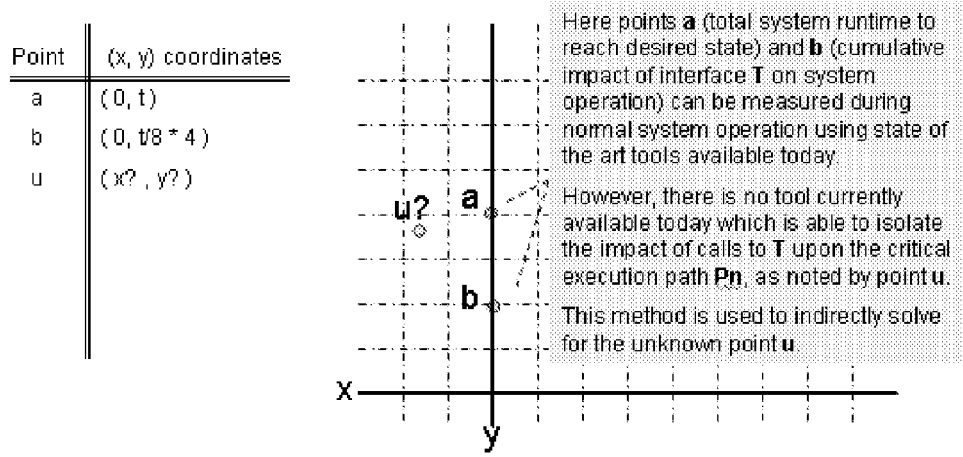
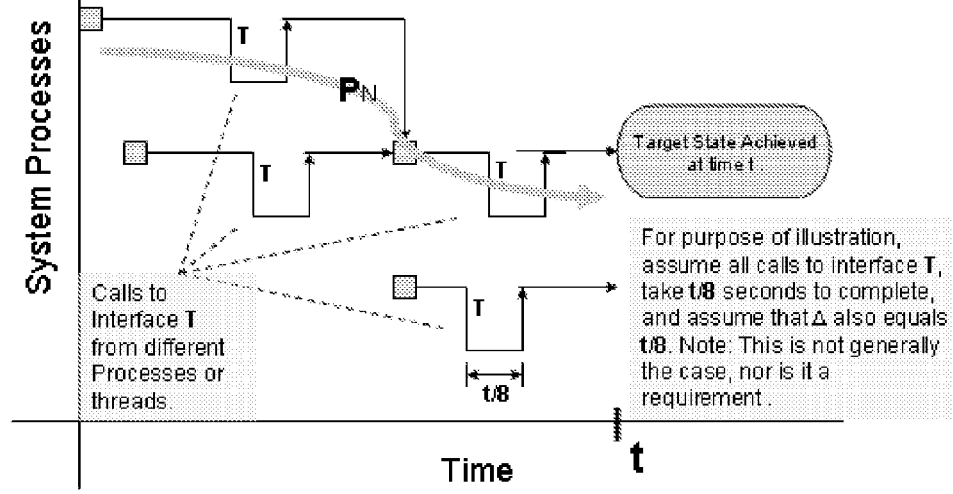
Figure 2.1: Hypothetical System

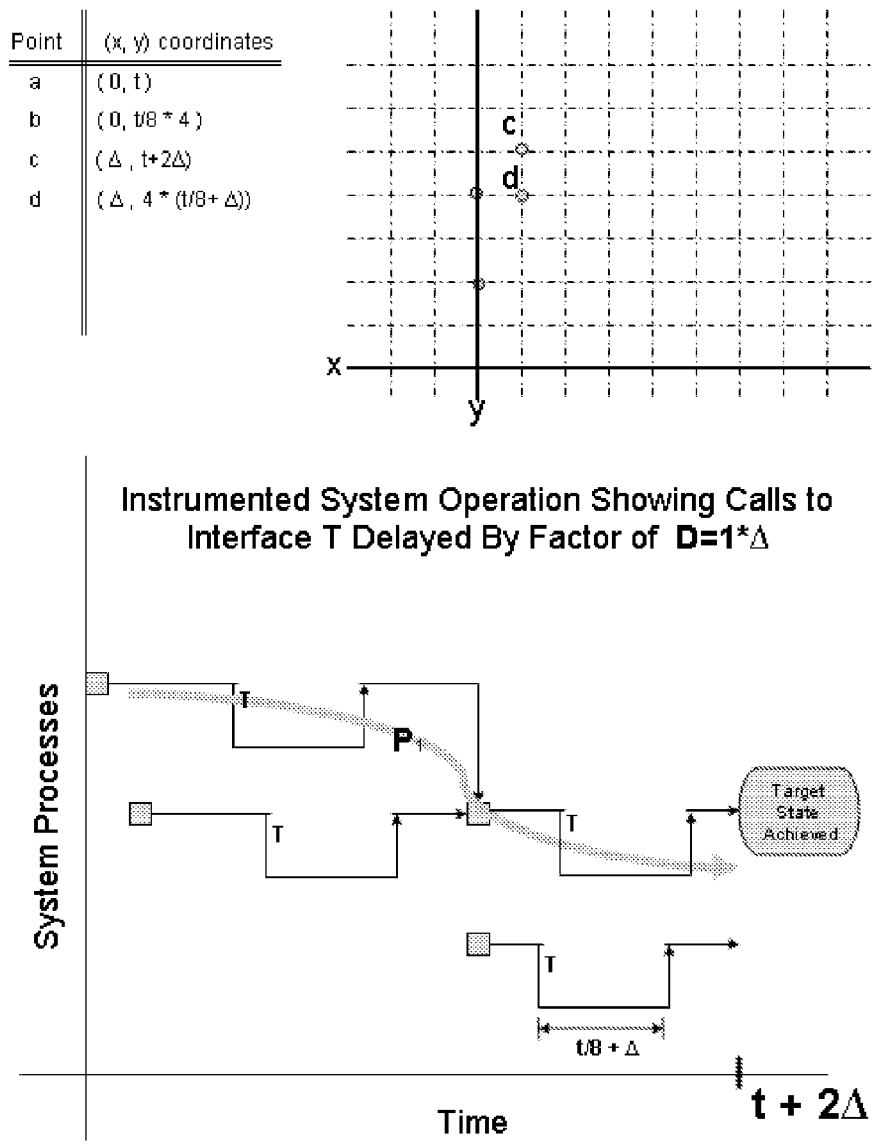
Figure 2.2: Instrumentation With Δ Delay

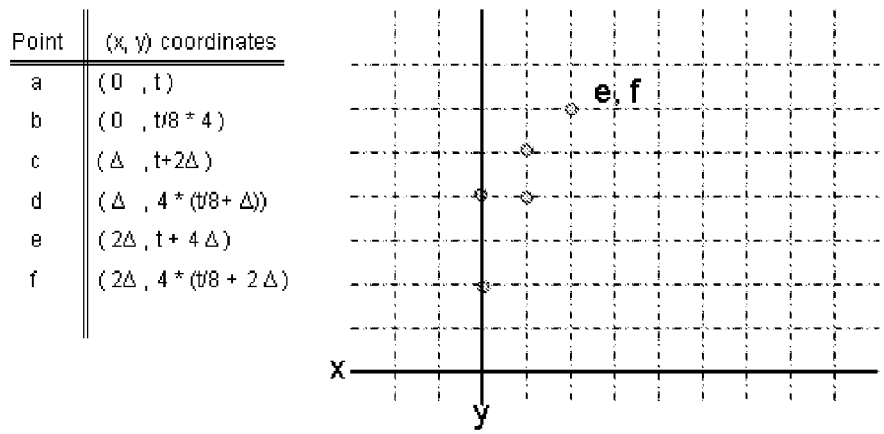
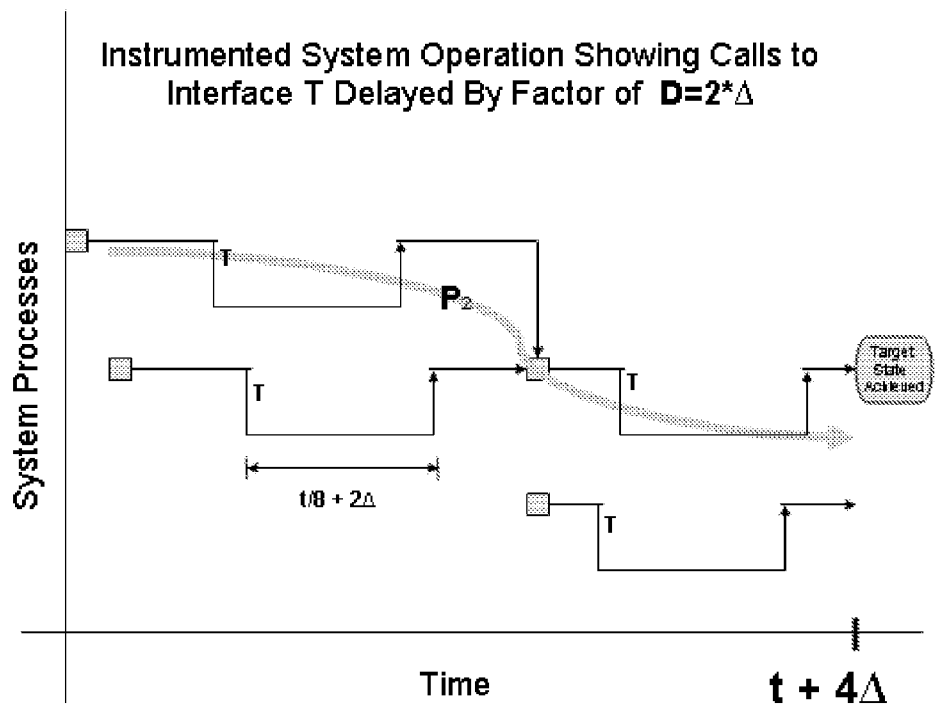
Figure 2.3: Instrumentation With 2Δ Delay

| Point | (x, y) coordinates |
|---|---|
| a | (0, t) |
| b | (0, t/8 * 4) |
| c | (Δ, t+2Δ) |
| d | (Δ, 4 * (t/8 + Δ)) |
| e | (2Δ, t + 4Δ) |
| f | (2Δ, 4 * (t/8 + 2Δ)) |
| u | (-Δ, 3t/4) |

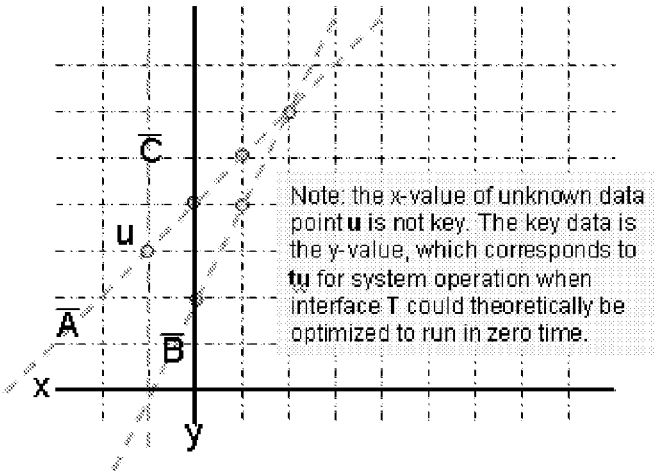

Note: the x-value of unknown data point u is not key. The key data is the y-value, which corresponds to tu for system operation when interface T could theoretically be optimized to run in zero time.

Unknown System Operation : Solved.

The unknown y-value of point u is extrapolated using linear regression. Thus, if interface T could be optimized to run in zero time, the system state would complete in 3t/4 time.

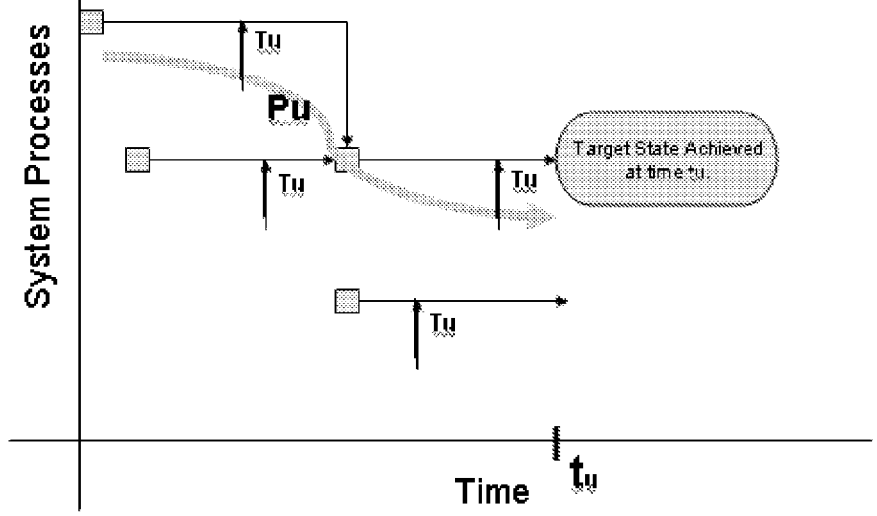

Figure 2.4: Final Solution

High Level Overview

INDIRECT SOFTWARE PERFORMANCE ANALYSIS

FIELD OF THE INVENTION

The invention generally relates profiling tools and methods for system-level performance impact of individual computing components on an end-to-end operation of a computing system.

BACKGROUND OF INVENTION

Software profiling tools are well known in the art as tools which allow one or more software designers to determine the performance characteristics of an individual software component. Most profiling tools require some "instrumentation" of the code which is to be measured, where the instrumentation includes some changes to the code itself to allow the profiling tool access to its data areas, execution cycles, etc.

Profiling tools of the current art may be applied to processes, threads, scripts, servers, clients, and daemons in computing systems which run a variety of operating systems on a variety of computing hardware platforms.

The profiled software components may be executed in a dedicated computing platform, in a distributed system, in a part of a cluster, or in a cloud computing environment.

SUMMARY OF EXEMPLARY EMBODIMENTS OF THE INVENTION

Performance impact of a computing system component on a transient end-to-end system operation is estimated by profiling an overall characteristic for a transient end-to-end system operation, and simultaneously profiling a program code component for a second characteristic, thereby collecting a first pair of data points, repeating the operational period while introducing a known artificial delay into the program code component, and while profiling the overall performance characteristic for the system and for the program code component, thereby collecting pairs of data points for each repetition of the operational period for each of the artificial delays; curve fitting and analyzing intercepts of the collected data points to estimate the effect of the artificial delays in the program code component on the transient end-to-end system operation; and reporting the estimate correlated to potential optimal transient end-to-end system operation.

BRIEF DESCRIPTION OF THE DRAWINGS

The description set forth herein is illustrated by the several drawings.

FIGS. 2.1 through 2.4 illustrate operation of a hypothetical system according to the present invention.

DETAILED DESCRIPTION OF EXEMPLARY EMBODIMENT(S) OF THE INVENTION

Figure 1:
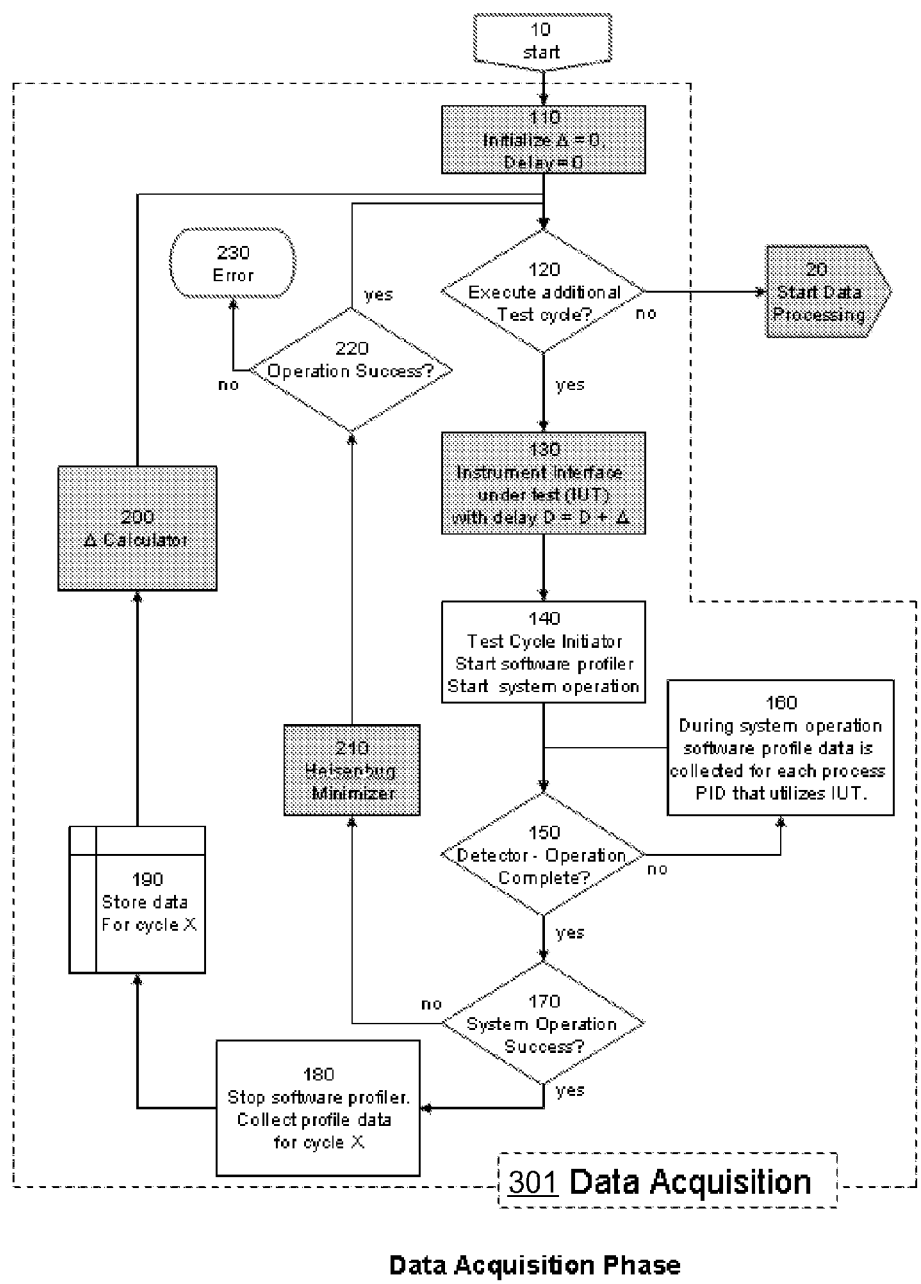
FIG. 1 depicts a logical process according to the present invention for improved data collection during profiling of a system and of a component.

The inventors of the present and the related invention have recognized problems not yet recognized by those skilled in the relevant arts regarding software performance profiling tools with respect to their use to profile processes which may change performance characteristics due to being instrumented for profiling, and with respect to consideration of overall or "end-to-end" system performance impact of a particular process, object, class of objects, interface, etc., during transient periods of operation.

The present inventors have recognized that the current state of the art software profiling tools do not provide an accurate profiling estimate of the true performance impact of a software interface upon an entire system's end-to-end operation during transient conditions when that interface is involved in many parallel sub-operations executed by many different processes, threads, scripts, servers, clients, and daemons with a high level of concurrency.

For the purposes of this disclosure, we will use "end-to-end" as a criteria to refer generally to a system level performance criteria during non-steady-state, transient conditions, such as during system boot up time, system re-start time, batch processing start up or wind down, system load changes, system resource changes, etc., which involves a plurality of hardware and software computing components, being executed and used in parallel and serial fashions under the control of a multi-tasking and multi-threading operating system to achieve a change in overall system operational conditions, especially such as occurs during on-demand and grid computing operations.

Also for the purposes of this disclosure, we will use "interface" to refer generally to individual processes, threads, scripts, servers, clients, and daemons. And, we will use "critical execution path" to refer to a collection, series, set of parallel interfaces, or combination thereof, which has a considerable outcome on an end-to-end system criteria, such as a particular application program or resource interface which causes considerable delay in system boot up. Because most operating systems may multi-task and execute multi-threads concurrently, and because most end-to-end operations may actually involve different sequences of executions, calls, returns, etc., each time the end-to-end operation is performed, an individual's impact on an end-to-end operation may be different each time the end-to-end operation is performed. For example, depending on the asynchronous relationships between the execution of several processes called during boot up, Process A may wait on Process B (process B is started later in this first boot up instance) for significantly longer during a first boot up, but not as long in a second boot up (process B is started earlier in this second boot up instance).

Furthermore, such system operations may be executing on multiple core architectures further complicating the measurement attempts. Further still, the operation might even be running in a distributed system, cluster, or in a cloud computing environment, which further complicates the matter of determining how an individual software component's performance may be hindering or helping critical path execution for an end-to-end system operation.

More specifically, the problem recognized by the present inventors is that no state of the art tool takes into account the critical execution path of the system during a transient end-to-end operation (e.g. boot up, re-start, etc.) which governs or drives the overall performance characteristics to arrive at a more accurate measurement. Current state of the art profiling tools only look at the performance of an individual component and not in the context of a transient end-to-end system operation. Some benchmarking tools work well for steady state modes of computer systems, but these tools are not accurate during transient periods such as during system boot up, during system re-start, during dynamic load adjustment (e.g. off loading applications, loading on new applications), and dynamically reconfiguring system resources (e.g. provisioning or de-provisioning applications, databases, licenses, expanding or reducing storage resources, etc.).

Because not all profiling measurements are directly involved in the critical execution path in a system, this means that some of those measurements can be effectively disregarded when doing an end-to-end system measurement.

Such system end-to-end operations may be executing on multiple core architectures further complicating the measurement attempts. Further still, the end-to-end operation might even be running in a distributed system, cluster, or in a cloud computing environment.

One example of a single core system with a highly concurrent operation is the IBM Flexible Service Processor™ (FSP) and its operation "Boot to FSP Standby" or its operation "IPL" (Initial Program Load), or in lay terms "boot the server up". In the "boot to FSP Standby" example operation, there are many different processes and threads running, started at different times, all of which may at times be starting, stopping, waiting on some event or semaphore, sleeping, executing, etc., until the final desired state of "FSP Standby" is achieved.

In this example, if one is trying to determine the overall impact of a single interface (process, thread, script, etc.) on the overall end-to-end performance of the system, the current profiling tools are unable to deliver an accurate measurement because they do not take into account the parallel operation of the components which comprise the critical execution path without some further method of extending the data processing to identify the desired metric.

Having recognized this problem, the present inventors have devised and tested a method of software performance analysis or dynamic program analysis which improves upon the state of the art in software profiling by allowing a user to ascertain the desired true metric or measurement which estimates the performance impact of a single interface (or process, script, thread, etc.) on an end-to-end operation of a computing system involving many parallel, concurrent processes and sub-operations. The limitation of the current state of the art is that while there are a multiplicity of programs and tools which address the problem of doing software profiling for individual processes, programs, or sub-operations, that the problem in this case eludes the current tools available because they do not take into account the collective impact of an interface being profiled on an end-to-end system operation in which many processes or programs are acting in parallel with numerous complex relationships, dependencies, and state transitions. The currently available state of the art tools do not provide a method for isolating the interface under test's impact upon the critical execution path that governs the true overall end to end performance of such a running system, and thus any naive attempt to "sum up" the cumulative impact of a software interface's measurements during end to end operation will result in an overestimation of the true impact of that interface upon system operation.

The problem is further complicated because in general, any time a software system is instrumented, the act of instrumentation itself introduces the additional possibility of "Heisenbugs" or an unexpected software behavior specifically related to the instrumentation itself. Because the present invention involves instrumenting the software being profiled in its method needed to gather the necessary additional data for this method, a complimentary method of minimizing the side-effects of Heisenbugs due to the necessary instrumentation is also disclosed.

The present invention, and methods according to it, would be beneficial as a stand-alone tool, as well as improvements to the processes and methods of well-known profiling tools such as gprof, Linux Trace Toolkit, and sysprof. Such an improvement to these profiling tools would allow them to address the problem of isolating and measuring the true impact of a given interface under test on an end-to-end system operation.

According to one aspect of embodiments according to the present invention, code instrumentation is used to introduce artificial delays upon one or more suspect software interfaces (interfaces-under-test or IUT) for the ultimate purpose of creating a mathematical model that enables the measurement of the true impact of the interface upon the end to end operation of a system, or distributed operation.

By executing additional instrumented system test cycles with the artificial delays added in, a synthesized model is created which isolates the true impact of the interface during system operation upon the critical execution path. After additional instrumented data is collected for a number of test cycles, the data is mathematically processed to extrapolate the unknown desired data point using linear regression and vertical fit.

Embodiments according to the present invention can be further extended to include putting instrumentation within certain portions of the software interface(s). For example, it could be put in the multi-threaded supported section of the interface and compared with the results from the overall software interface tests. This would provide profiling information on how well enabled an IUT is for multi-threading, and would also provide use case information for the IUT interface. The same extension be done with multi-processing supported sections within the IUT.

At least one advantage and benefit of using the inventors' new approach over the current state of the art software code profiling tools is the ability to accurately measure the end-to-end performance impact of an IUT in a highly parallel system, distributed, or cloud environment, where such an IUT is being used by multiple processes and threads concurrently in parallel. Current tooling does not account for the isolation of parallel activity upon the critical execution path from the total impact of the interface on the system operation.

The following examples further illustrate one or more embodiments of the invention, but do not represent the extent or scope of the invention, instead serving to provide details of at least one embodiment of the invention.

In the series of following figures, a method according to the present invention is applied to a hypothetical system showing how a result can be obtained that is 50% more accurate than what could be determined using current state of the art tools alone.

Turning to FIG. 2.1, operation and performance of a hypothetical complex multi-tasking or multi-threading computing system and its normal operation is graphically illustrated. This illustration could be, for example, a boot up process. The top graph, which resembles a Cartesian coordinate system, shows time delay or time to reach a particular computing state (initialized, booted, etc.) on the y axis, and the x axis represents the time of the inserted delay (x=zero for normal system operation with no added delays) of concluding the critical execution path $P_n$—e.g. when the system is booted up with added delay of $1*\Delta$, the total time to complete boot up is represented by point $(1*\Delta, y_1)$, when the system is booted up with added delay of $2*\Delta$, the total time is represented by point $(2*\Delta, y_2)$, . . . and so forth until $(n*\Delta, y_n)$ is measured. Thus, each point a, b, etc., have two coordinates, and x component which represents the amount of delay added to the IUT in the critical execution path, and a y component which represents the total time to complete the critical execution path to reach the desired state of operation.

In this example, point a may represent the total time of the system running to reach a desired operational state (e.g. from power on to booted FSP), and point b may represent the cumulative time delay impact of interface (component) T being called on the overall end-to-end operation (e.g. delay impact of calling the T interface, process, script, thread, etc.). Point u represents the unknown impact of the execution of T on the total time spent executing critical execution path $P_n$. In this example end-to-end process, only two of the four calls to an interface T to be profiled actually directly impact the critical execution path $P_N$ for the end-to-end system operation. Also note that no delays have been added yet to indirectly profile the interface T in search of the unknown point u and its y axis value.

In the lower diagram of FIG. 2.1, there are shown three calls or executions (square boxes) of the IUT T, wherein time is progressing from left to right, the periods when an instance of T is running are shown in lows (0's), and the periods during which an instance of T is running are shown in highs (1's). There are three instances of T shown in this example, but only two instances (the top two) are part of the critical execution path $P_n$ (shown by thick gray arrow) to reach the target or desired state of operation at time t.

So, in this example "unimproved" operation (e.g without benefit of the invention), it is desired to know the impact (e.g. $y_u$ delay value) of data point u which is the amount of impact that the interface T has on reaching the desired state at time t. If, for example, the response time or completion time of all instances of T could be magically optimized to zero seconds (extreme best case scenario), u represents the end-to-end time with no impact by T.

In a more concrete example, consider a complex computing system which currently requires 60 seconds to boot up. The administrators have a hunch that database calls are consuming most of this time to boot up, so we use T to represent calls to the database interface. If, the database's response time were magically set to zero, then the impact of the database on a particular instance through the critical execution path (e.g. to boot up once) would be $\Delta = t_{normal\_boot\_up} - t_{zeroed\_T}$. In this example, if $t_{zeroed\_T}$ is found to be 40 seconds, then it would be known that best case, optimization of the interface T would approach a reduction $\Delta$ in boot time of 20 seconds, but not more. However, it is impractical to set an interface to zero response time, so this is just an illustration of the value the present invention seeks to determine through other methods.

Turning now to FIG. 2.2, a single test cycle with artificial delays added to interface T (the IUT) according to the present invention is illustrated relative to FIG. 2.1 (without delays to T). Please note here that adding delays to an IUT is counter-intuitive according to the ordinary wisdom in the art, whereas the ordinary wisdom states that one should try to reduce the response time of the IUT to see the impact it has on the critical path execution. But, by adding delays of $\Delta$ (e.g. $1*\Delta$) milliseconds to the IUT, new data points c and d are placed on the graph. Point c is the time the system needed on a first test (x=1) to complete its end-to-end operation for this instrumented test cycle, and point d is the sum total of all time spent inside the artificially delayed interface T during this first system test cycle. So, the coordinates of point c and d are $(1*\Delta, t+2\Delta)$ and $(1*\Delta, 4*(t/8+\Delta))$, respectively.

In the lower portion of FIG. 2.2, there is an illustration of the timing of the first completion of the critical execution path $P_n$ through the two calls to the T interface to reach the target or desired state of operation, and the width (time) of the execution of each call to interface T is shown as being $(t/8+\Delta)$, where t/8 was the time of execution of T without any added delays.

Continuing with this example to FIG. 2.3, points e and f are found by adding twice the delay $\Delta$ to interface T, and measuring the respective critical path execution times, including the time to complete a single execution of T being shown as $(t/8*2\Delta)$ in the lower portion of the diagram. This figure shows how the synthesized mathematical model continues to gain accuracy as additional test cycles are executed with each subsequent level of artificial delay added. The relationship that interface T has upon the critical execution path becomes clearer with a greater number of data points.

Referring now to FIG. 2.4 and continuing with the present example, several data points a through f have been collected and plotted in the upper portion of the figures. This clearly shows how the unknown value u is solved for by using linear regression lines A and B, and vertical fit line C to find unknown point u. The unknown point u can be validated further because its y value must be greater than zero and simultaneously less than the y-value of point b. Only the y-value of point u is of interest because it corresponds to the amount of time it would take the computing system to reach its desired state (e.g. booted up in this example) if the interface under test could theoretically be optimized to run in zero time. In this example the estimate found for point u shows that the computing system would run in 3t/4 time if the interface T could be optimized to run in zero time. In this case, the estimate obtained is 50% more accurate than current profiling tools can provide as evidenced by the y-values of points u (this method) and b (generated using the current state of the art).

In summary of the previous series of FIGS. 2.1 through 2.4, embodiments according to the present invention obtain a more accurate estimate of the impact of an interface on an end-to-end system operation. In the particular hypothetical case presented, the estimate obtained is 50% more accurate than could be obtained using current state of the art tools alone without additional post collection analysis which may be prohibitively costly or time consuming.

Another advantage of using embodiments of this invention is in time saved doing measurement. For complex systems, it may be very difficult to determine what the critical execution path is through a system without looking deeply at system traces, program traces, and debug. The present method allows a user to indirectly obtain an accurate estimate of an interface(s) impact on end-to-end system operation without needing to do prohibitively expensive analysis, testing, and debugging.

Further, another advantage of embodiments according to the present invention is to developers, managers, project managers, and system architects. For complex systems and products developed by numerous developers, these decision makers need to know which parts of the product to focus scarce resources on. In addition, the decision makers need to know what the best possible outcome could be if an interface could be optimized perfectly to execute in zero time. In this manner, the decision maker can make that cost benefit decision and decide how much time it is worth spending to obtain the best possible outcome.

Figure 3:
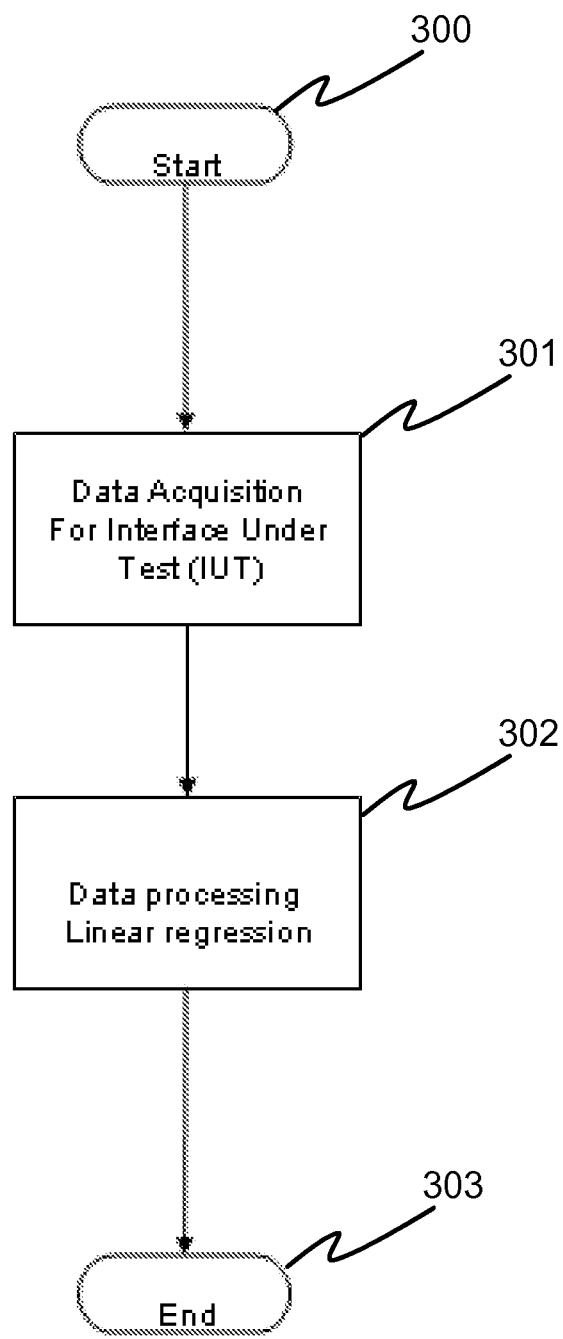
FIG. 3 illustrates a high level logical process according to the invention.

In FIG. 3, a very high level logical process according to the present invention is shown in which the process is started (300), data points are acquired from the IUT (301) including a variety of test using different amounts of added delay, the collected data is analyzed (302) to find a fit to the data points such as by linear regression or other methods of curve fitting, and the results are output (303) for a user's knowledge.

FIG. 1 shows improvements to data acquisition (301) of profiling methods, according to at least one embodiment of the invention, wherein the steps, operations and limits shown in the gray boxes represent distinctive departures from the typical profiling data acquisition methods. Acquisition is started (10), in which the added delay amount A is initialized (110) to zero, and the IUT is operated (130,140) normally with no added delay in order to capture a baseline data point(s) (150, 160) until successful (170), after which the profiling is stopped (180) and the data point(s) is(are) stored (190). The next added delay is calculated (200), e.g. $2*\Delta$ for the second data point, $3*\Delta$ for the third data point, etc., and the profiler is executed again (120, 130, 140, 150, 160, 170, 180, 190, 200), including optional error handling (220, 230). This process is continued for as many data points as needed to support an accurate estimation of the unknown impact value u, at which point the data analysis (20) is performed on the collected data points.

Figure 4:
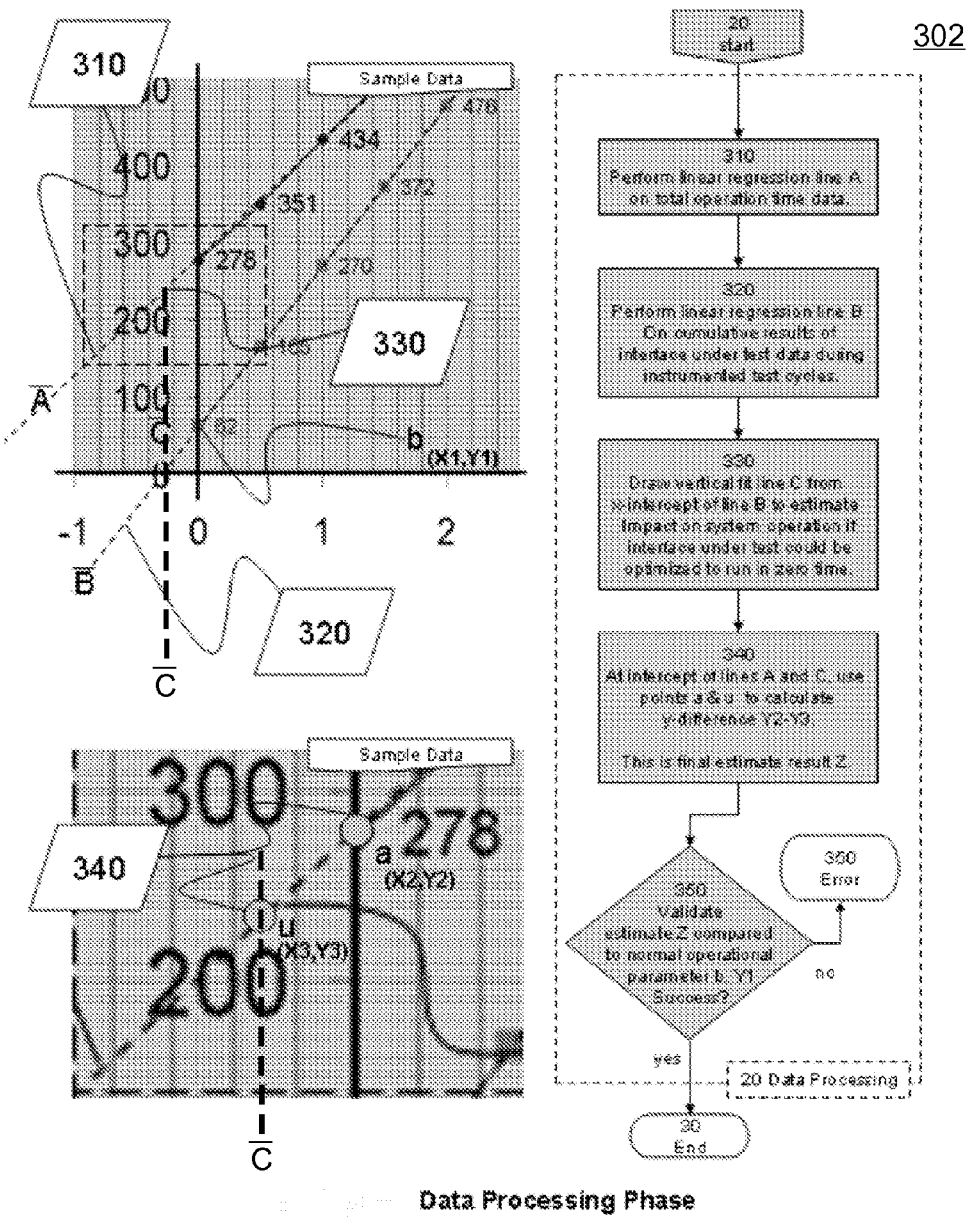
FIG. 4 sets forth a logical process for analyzing the collected data according to the present invention.

Turning now to FIG. 4, the data processing starts (20) by performing a linear regression process (310) on a first line A on the total operation time data points, and then by performing a linear regression operation (320) on line B on the cumulative result data points of the IUT during the instrumented test cycles. Next, a vertical fit for a line C from the intercept of line B is performed (330) to estimate the impact on end-to-end system operation if the IUT could be optimized to run in zero time.

And, an intercept of lines A and C is calculated (340) (e.g. a common solution solved for), and then the y difference magnitude $|Y_2-Y_3|$ is calculated (340) to yield the sought Z estimate of impact of interface T on the end-to-end system operation.

This may be validated (350), after which the Z value is either provided to the user (30) such as in a human-readable report or through an on-screen display, or an error is declared (350) if validation fails.

Suitable Computing Platform.

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
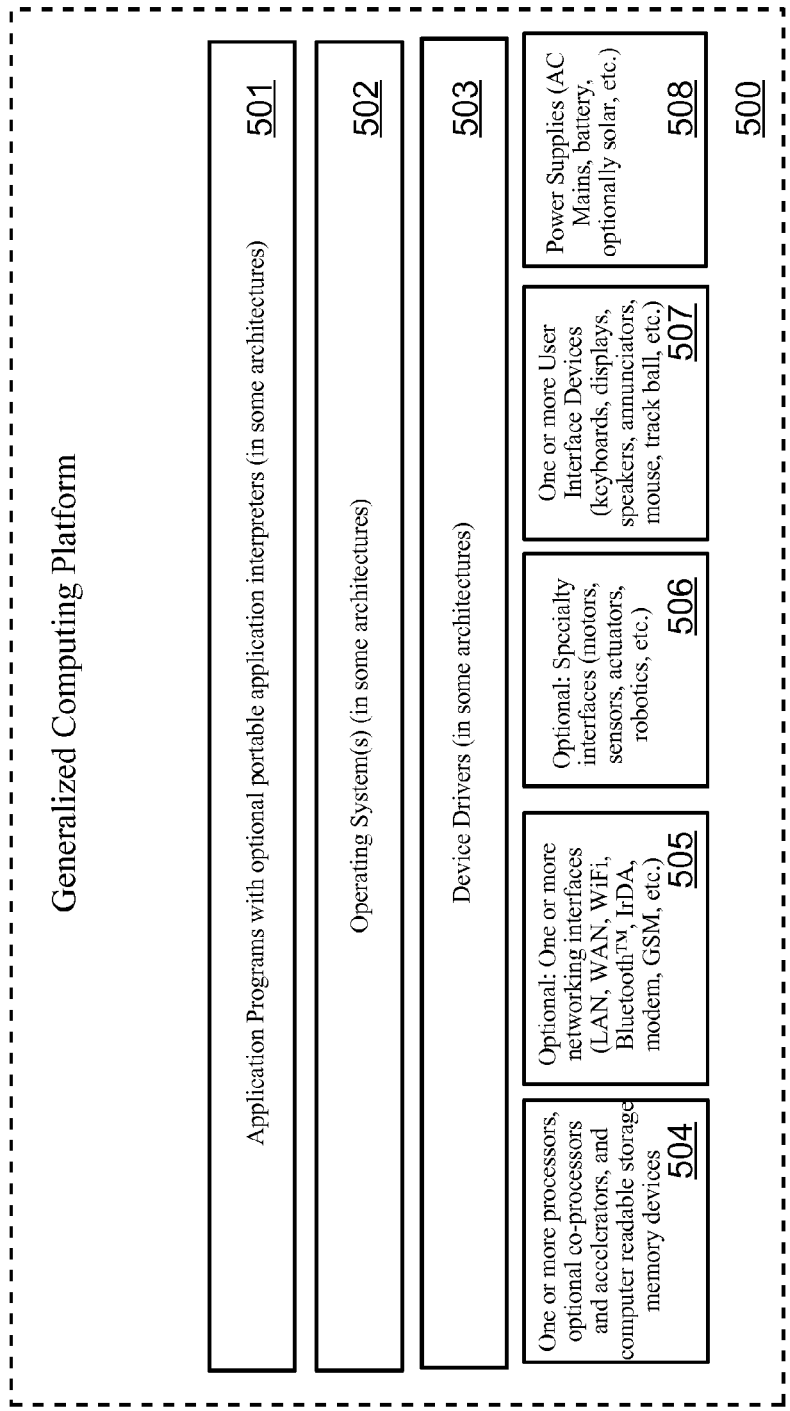
FIG. 5 sets forth a generalized computing platform suitable for realization of at least one embodiment of the present invention.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein.

Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method of estimating performance impact of a computing system component on a transient end-to-end operation comprising:

during a transient state in a computing system, performing a first profiling by a computer for a first performance characteristic for a transient end-to-end system operation, and simultaneously profiling a program code component for a second performance characteristic, thereby collecting a first pair of data points comprising the first and second performance characteristics for the first profiling of the default transient;

introducing by a computer at least a first artificial delay in to the program code component;

performing at least a second profiling during a transient state for the performance characteristic for the transient end-to-end system operation as affected by one or more artificial delays, and simultaneously profiling by a computer the program code component for the second performance characteristic, thereby collecting by a computer at least a second pair of data points, one pair of data points being collected for each repetition of the transient state in which each repetition introduces a different artificial delay such that the data point pairs correspond to each artificial delay amount;

performing by a computer curve fitting and intercept analysis on the data point pairs to estimate the transient end-to-end system operation for a hypothetical zeroed response time of the program code component; and providing by the computer the estimate of effect into a user-readable report.

2. The method as set forth in claim 1 wherein the transient state comprises a boot up period.

3. The method as set forth in claim 1 wherein the transient state comprises a re-start period.

4. The method as set forth in claim 1 wherein the transient state comprises a dynamic load change.

5. The method as set forth in claim 1 wherein the transient state comprises a dynamic change in computing resources.

6. The method as set forth in claim 1 wherein the program code component comprises one or more components selected from the group consisting of a computer process, an execution thread, an object instance, a script, a server, a client, and a daemon.

7. The method as set forth in claim 1 wherein the curve fitting comprises linear regression.

8. A computer program product for estimating performance impact of a computing system component on a transient end-to-end operation comprising:

a hardware memory device;

first program code for, during a transient state in a computing system, performing a first profiling for a first performance characteristic for a transient end-to-end system operation, and simultaneously profiling a program code component for a second performance characteristic, thereby collecting a first pair of data points comprising the first and second performance characteristics for the first profiling of the default transient;

second program code for introducing at least a first artificial delay in to the program code component;

third program code for, performing at least a second profiling during a transient state for the performance characteristic for the transient end-to-end system operation as affected by one or more artificial delays, and simultaneously profiling by a computer the program code component for the second performance characteristic, thereby collecting by a computer at least a second pair of data points, one pair of data points being collected for each repetition of the transient state in which each repetition introduces a different artificial delay such that the data point pairs correspond to each artificial delay amount;

fourth program code for performing curve fitting and intercept analysis on the data point pairs to estimate the transient end-to-end system operation for a hypothetical zeroed response time of the program code component; and fifth program code for providing the estimate of effect into a user-readable report;

wherein the first, second, third, fourth, and fifth program codes are stored by the hardware memory device.

9. The computer program product as set forth in claim 8 wherein the transient state comprises at least one period selected from the group consisting of a boot up period, a re-start period, a dynamic load change, and a dynamic change in computing resources.

10. The computer program product as set forth in claim 8 wherein the program code component comprises one or more components selected from the group consisting of a computer process, an execution thread, an object instance, a script, a server, a client, and a daemon.

11. The computer program product as set forth in claim 8 wherein the curve fitting comprises linear regression.

12. A system for estimating performance impact of a computing system component on a transient end-to-end operation comprising:

a computer system having a processor and a hardware memory device, storing program code for causing the processor to:

during a transient state in a computing system, perform a first profiling for a first performance characteristic for a transient end-to-end system operation, and simultaneously profiling a program code component for a second performance characteristic, thereby collecting a first pair of data points comprising the first and second performance characteristics for the first profiling of the default transient;

introduce at least a first artificial delay in to the program code component;

perform at least a second profiling during a transient state for the performance characteristic for the transient end-to-end system operation as affected by one or more artificial delays, and simultaneously profiling by a computer the program code component for the second performance characteristic, thereby collecting by a computer at least a second pair of data points, one pair of data points being collected for each repetition of the transient state in which each repetition introduces a different artificial delay such that the data point pairs correspond to each artificial delay amount;

perform a curve fitting and intercept analysis on the data point pairs to estimate the transient end-to-end system operation for a hypothetical zeroed response time of the program code component; and provide the estimate of effect into a user-readable report.

13. The system as set forth in claim 12 wherein the transient state comprises at least one state selected from the group consisting of a boot up period, a re-start period, a dynamic load change, and a dynamic change in computing resources.

14. The system as set forth in claim 12 wherein the program code component comprises one or more components selected from the group consisting of a computer process, an execution thread, an object instance, a script, a server, a client, and a daemon.

15. The system as set forth in claim 12 wherein the curve fitting comprises linear regression.

* * * * *